United States Patent

[11] 3,593,397

| [72] | Inventor | Jean Odier |
| | | Antony, France |
| [21] | Appl. No. | 824,240 |
| [22] | Filed | May 13, 1969 |
| [45] | Patented | July 20, 1971 |
| [73] | Assignee | Societe Anonyme Francaise du Ferodo |
| | | Paris, France |
| [32] | Priority | May 20, 1968 |
| [33] | | France |
| [31] | | 152 438 |

[54] TEST STAND ROLLER
17 Claims, 9 Drawing Figs.

[52] U.S. Cl. .................................................. 29/130,
29/113, 73/117
[51] Int. Cl. .................................................. B21b 31/08
[50] Field of Search .................................................. 29/113,
116, 130; 73/117, 126, 146

[56] References Cited
UNITED STATES PATENTS

| 748,674 | 1/1904 | Webb | 29/118 UX |
| 2,215,692 | 9/1940 | Fleming | 29/113 UX |
| 2,722,255 | 11/1955 | Townsend | 29/113 X |
| 2,982,128 | 5/1961 | Gibson et al. | .73/117 |
| 2,984,335 | 5/1961 | Rhodes | 29/113 UX |
| 3,057,192 | 10/1962 | Huffman et al. | 73/117 |
| 3,116,787 | 1/1964 | Campbell | 29/113 X |
| 3,402,599 | 9/1968 | MacMillan | 73/117 |

FOREIGN PATENTS

| 10,640 | 1895 | Great Britain | 29/113 |
| 139,518 | 4/1903 | Germany | 29/113 |
| 1,120,757 | 12/1961 | Germany | 73/117 |

*Primary Examiner*—Alfred R. Guest
*Attorney*—Young & Thompson

ABSTRACT: The invention relates to a roller having a case preferably of metal intended in particular for use in the stationary testing of a self-propelled vehicle. This roller has a gastight enclosure, formed between an outer cylindrical rolling or bearing wall, an inner cylindrical wall coaxial with the first wall, and two annular sealing flanges extending from one wall to the other at the extremities of the walls, the said enclosure may be pressurized in relation to the surrounding atmosphere.

PATENTED JUL 20 1971

INVENTOR
JEAN ODIER
BY Young & Thompson
ATTYS.

INVENTOR
JEAN ODIER
BY Young & Thompson
ATTYS

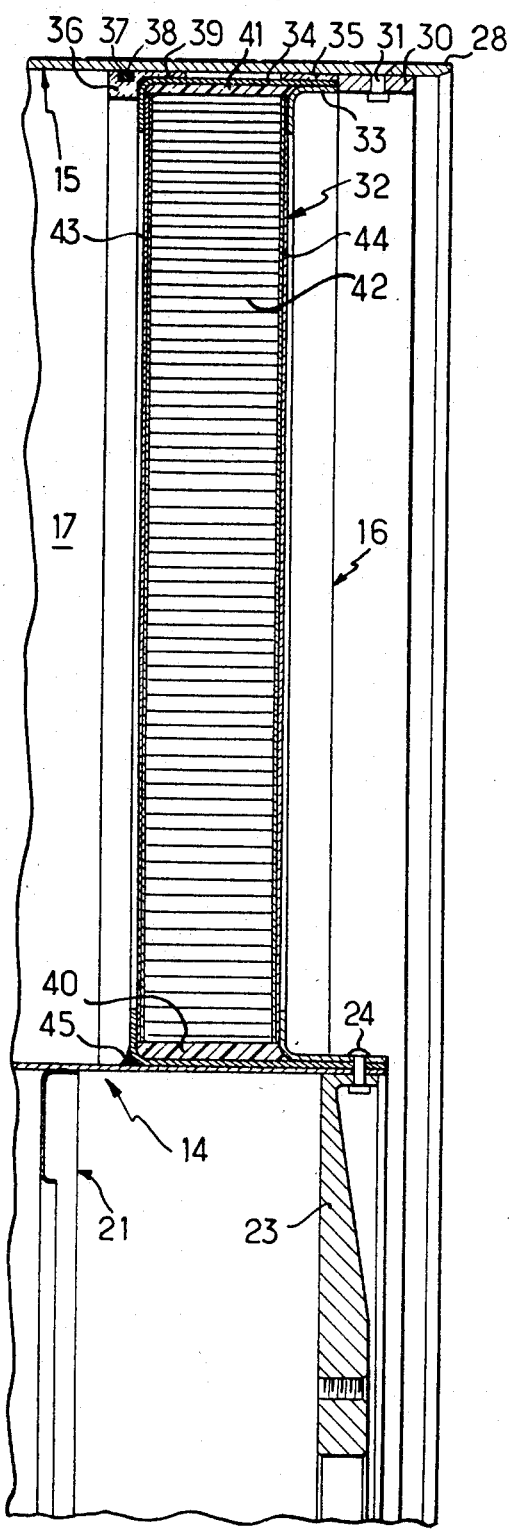
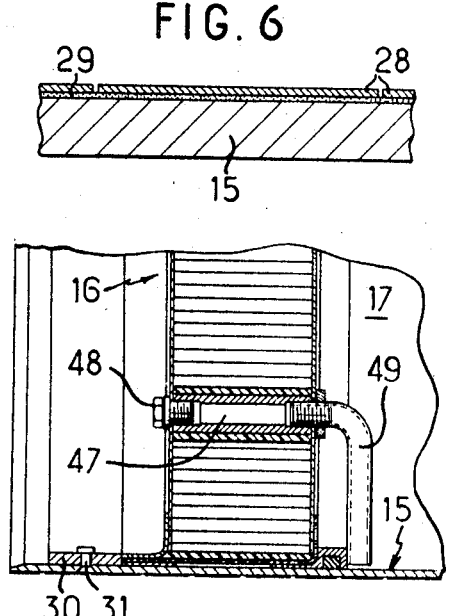
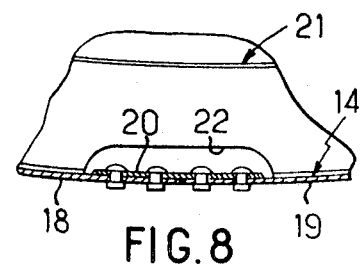

TEST STAND ROLLER

BACKGROUND OF THE INVENTION

The present invention relates to rollers which have particular, though not exclusive, application to stationary test stands for supporting the wheels of self-propelled vehicles during testing of the vehicles.

At present, these rollers consist of a steel band carried on radial tie rods.

So that this band or drum may provide an appropriate rigidity enabling it to bear one of the wheels of a vehicle together with its load, it is necessary to give it a substantial wall thickness, for example of the order of 8 mm. or 0.315 inches.

Making allowance on the one hand for the comparatively large diameter that these rollers should have, for example of the order 1.5 to 2.5 meters or 5 to 8 feet, to form appropriate rolling surfaces, and for the axial length that they should preferably have, for example of the order of 1.5 meters or 5 feet, to allow sufficient transverse movement of a vehicle under test with respect to the rollers carrying it, the wall thickness of the steel band referred to above results in the construction of rollers whose overall inertia corresponds to that of a relatively heavy vehicle, for example of the order of 3.5 tons.

When used as a constant speed test stand, of the kind employed for carburetion, lubrication or other checkups, such rollers, although heavy, may be acceptable.

By contrast, if the test stand is of the variable speed type of the kind employed, for example, for brake tests or it is a general test stand rendering it possible to check on brake performance while stationary while simulating as closely as possible the actual driving conditions of a vehicle on the road, these heavy rollers have substantial disadvantages.

In a case of this latter kind, it is necessary, in point of fact, that it should be possible to apply to the rollers accelerations or decelerations identical to those which could be applied to the vehicle under test while on the road; this cannot be achieved when the rollers are rotatably driven by the vehicle under test, unless the said rollers have an inertia equivalent to that of the vehicle.

This requirement is, however, not generally met since, as has been mentioned, these rollers are equivalent by their very structure to a vehicle of approximately 3.5 tons, while the vehicles to be tested are most frequently light vehicles, of approximately 0.8 to 1.5 tons.

It is thus necessary to coordinate the test stand with equipment arranged for the application to its rollers of an instantaneous inertial balancing force, which may have to be very great. A plant of this nature is obviously complex, and thus costly and unwieldy to handle.

Rollers in accordance with the present invention make possible the provision of plant which is less complex and costly and is more easy to handle than that previously known.

SUMMARY

According to the present invention there is provided a roller which may be used in a stationary test stand for self-propelled vehicles and which includes a fluidtight assembly having an outer cylindrical wall, an inner cylindrical wall arranged within and coaxial with the outer wall and an annular sealing flange extending from each end of the outer wall to a corresponding end of the inner wall, and fluid within the assembly at a pressure higher than that of the surrounding environment. This arrangement renders it possible to effect a considerable reduction in the thickness which it is necessary to give to the outer wall or band of the roller, and thereby to lighten the roller substantially.

The internal pressure of the fluid within assemblies in accordance with the invention is not so much intended, by itself, to make up for the loss in stiffness incurred by the outer supporting or rolling wall of the roller owing to any decrease in its thickness, but to allow this wall to bear, with impunity, any local deformation that may be caused by the load applied to it when it bears one of the wheels of a vehicle, or more explicitly, to withstand the periodic stresses and bending actions resulting from the localization of any deformation during a test. In point of fact, this internal pressure has the simple purpose of modifying the amplitude of any deformation and thus of any bending effects and strains caused thereby.

This deformation may have the result of artificially increasing the radius of curvature of the area of the roller it affects, and thus of advantageously bringing the running conditions of the vehicle under test closer to the running conditions of the vehicle resting on a flat rolling track and thereby be usefully exploited.

In one embodiment of the invention, at least one of the sealing flanges of the hermetically enclosed assembly of a roller has a valve through which the fluid may be introduced into or released from the assembly in order to adjust the pressure within the assembly.

Thus, for example, in the case of a roller whose diameter is approximately 2 meters or 6.56 feet, it is possible, by the appropriate choice of the internal pressure within the roller, for the diameter at the point of application of the wheel of the vehicle under test to be locally and temporarily raised to a higher value, which may, for example, reach and exceed 3 meters.

This arrangement makes it possible for the contact conditions established between the tires of the vehicle and the rollers to approximate those prevailing on the road between the tires and the road.

It is also possible to exploit the advantages of a structure for each of the rollers in the form of a sealed enclosure according to the invention, beyond that of inflation, by employing an arrangement which ensures improved cooling during a test.

In a further embodiment of the invention, provision is made for the feeding-in and permanent retention of a cooling fluid within each of the rollers. The coolant may, for example, consist of Freon 21, which is normally liquid, and vaporizers at 45° C. at a pressure of 2 bars.

When a roller is in rotation, the cooling fluid it contains will be flung by centrifugal force against the inner surface of the outer wall of the roller and form a film in contact with the wall.

A film of this nature is inherently able to promote uniformity of temperature in the wall and a better dissipation of the heat in the longitudinal direction, the heat being generated by rolling resistance, i.e. the resistance of the rolling or working surface to the load and, upon occasion, by any braking action, locally at the point of contact between the roller in question and the wheel that it bears.

Moreover, the cooling fluid in contact with the wall thus heated is vaporized, thereby cooling the latter. The vapor formed, being less affected by centrifugal force, drifts away from the wall and, prior to recondensing and reforming the film from which it had risen, it ensures a radial transfer of heat, which is not negligible, thereby still further improving the conditions for the dissipation of the heat.

As has been mentioned above, the pressurizing of the rollers renders it possible, in particular, for the wall thickness of the outer rolling wall of the rollers to be reduced, and thereby for their weight to be reduced. It is of importance, in the measurement of vibratory phenomena, for a roller to be light, particularly in the case of the measurements of mean or momentary force between a tire and a roller.

In this respect, provision is made, in yet another embodiment of the invention, for at least one of the cylindrical walls of the rollers, and preferably both, to be made of light metal or alloy, for example aluminum or duraluminum, there being, preferably, a protective coating on the surface of the wall.

In a preferred embodiment of the invention, the greater proportion of the component parts of a roller is made of light metal or alloy.

By this means it is possible to produce very light rollers whose overall inertia corresponds to a vehicle of approximately 0.8 ton, that is to say to one of the lightest vehicles.

To test heavier vehicles, it is sufficient to provide the corresponding overall inertia required in a very simple and very economic manner, by combining each of the rollers with an inertial flywheel, with the interposition of a gearbox between each roller and its coordinated additional flywheel.

It is thus possible to test a very wide range of vehicles on one and the same test stand, without any auxiliary inertial balancing system.

In a preferred embodiment of the invention, the outer cylindrical wall of a roller is a single band or drum of light metal or alloy, for example of treated aluminum, which is externally covered by a continuous strip of steel wound helically with contiguous turns on the wall.

This arrangement has the advantage, on the one hand, of giving the roller a higher safety factor, the steel strip having a mechanical strength which tends to mitigate the consequences which can result from a possible failure of the adjacent wall of light alloy, and, on the other hand, of giving the rolling or working surface of the roller a higher coefficient of friction and a greater resistance to wear.

It is obviously possible for any desirable covering, for example, of synthetic material possessing special frictional properties, to be arranged on top of this strip or even to be substituted for it if the safety conditions are satisfactory otherwise.

This steel strip is preferably bonded to the wall that it covers. This arrangement has a double advantage. On the one hand this ensures the necessary joint between the strip and the wall in very simple manner, covering the wall without employing rivets, screws or the like, which would impair the mechanical qualities of the wall locally. On the other hand, it results in the provision of an interposing film of insulating glue between the strip and the wall that it covers, a film of this kind tending to oppose any possible reaction of an electrochemical nature between the strip and the wall, specifically in those circumstances in which the tests are carried out in a damp atmosphere, for example during spraying or partial and systematic immersion of the rollers, in order to modify the conditions of adhesion for the vehicle under test; in this case, however, the thickness of the film of glue should be sufficiently small not to affect the required heat transfer from the steel strip to the light alloy wall that it covers.

In this respect, producing the wall of light alloy according to the invention has the additional advantage of assuring a better heat transfer by conduction, the thermal conductivity of aluminum, for example, being appreciably higher than that of steel.

BRIEF DESCRIPTION OF THE DRAWINGS

FIG. 6 shows a partial view of a detail of FIG. 5 on a larger scale, FIG. 7 reproduces another part of FIG. 3 at the same scale as FIG. 5, and FIGS. 8 and 9 are views of details in section, respectively along the lines VIII–VIII and IX–IX of FIG. 3.

DESCRIPTION OF THE PREFERRED EMBODIMENT

Figure 1:
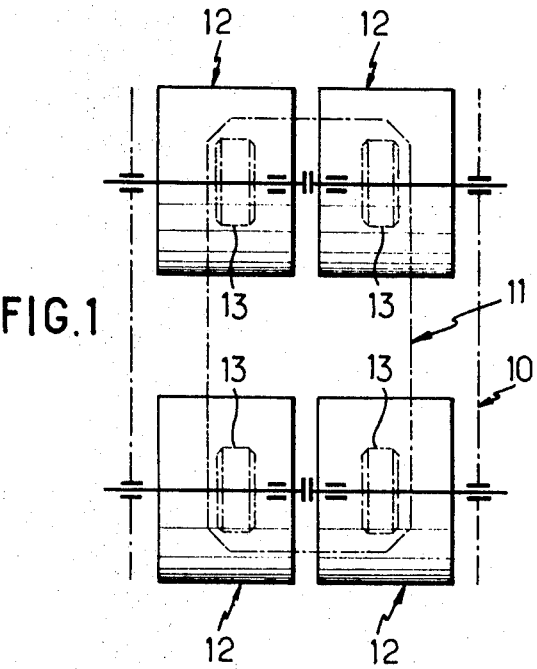
FIG. 1 is a diagrammatic plan view of a stationary test stand for vehicles.
Figure 2:
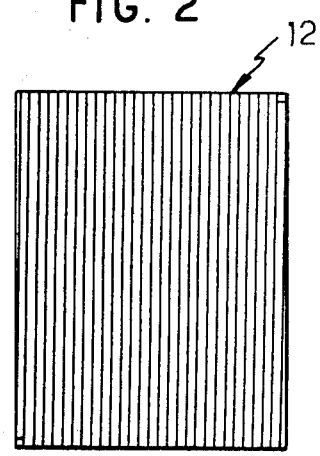
FIG. 2 is an elevation of a roller suitable for use in a stand as shown in FIG. 1.

Referring to the drawings FIG. 1 is a diagrammatic illustration of a test stand 10 for the stationery testing of a vehicle 11, for which application the rollers according to the invention are more specifically intended. A test stand of this nature includes four rollers 12, each carrying one of the wheels 13 of the vehicle 11. The rollers 12 are "paired" by means of devices which are not illustrated, and are driven by the vehicle which is to be tested.

Figure 4:
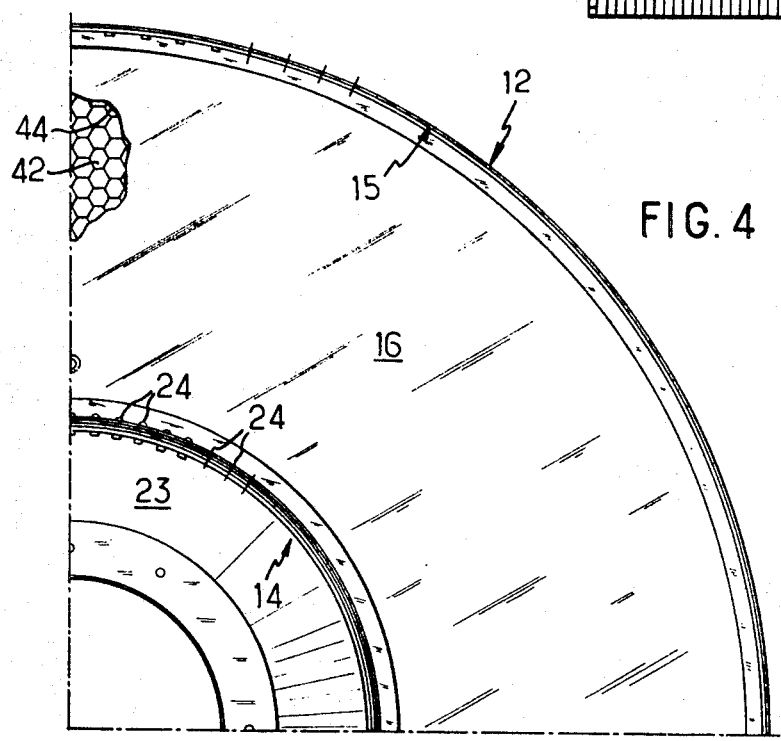
FIG. 4 is a quarter of an end view, partially cut away, of this roller along the line IV–IV of FIG. 3, FIG. 5 reproduces an enlarged scale view of a part of FIG. 3.
Figure 3:
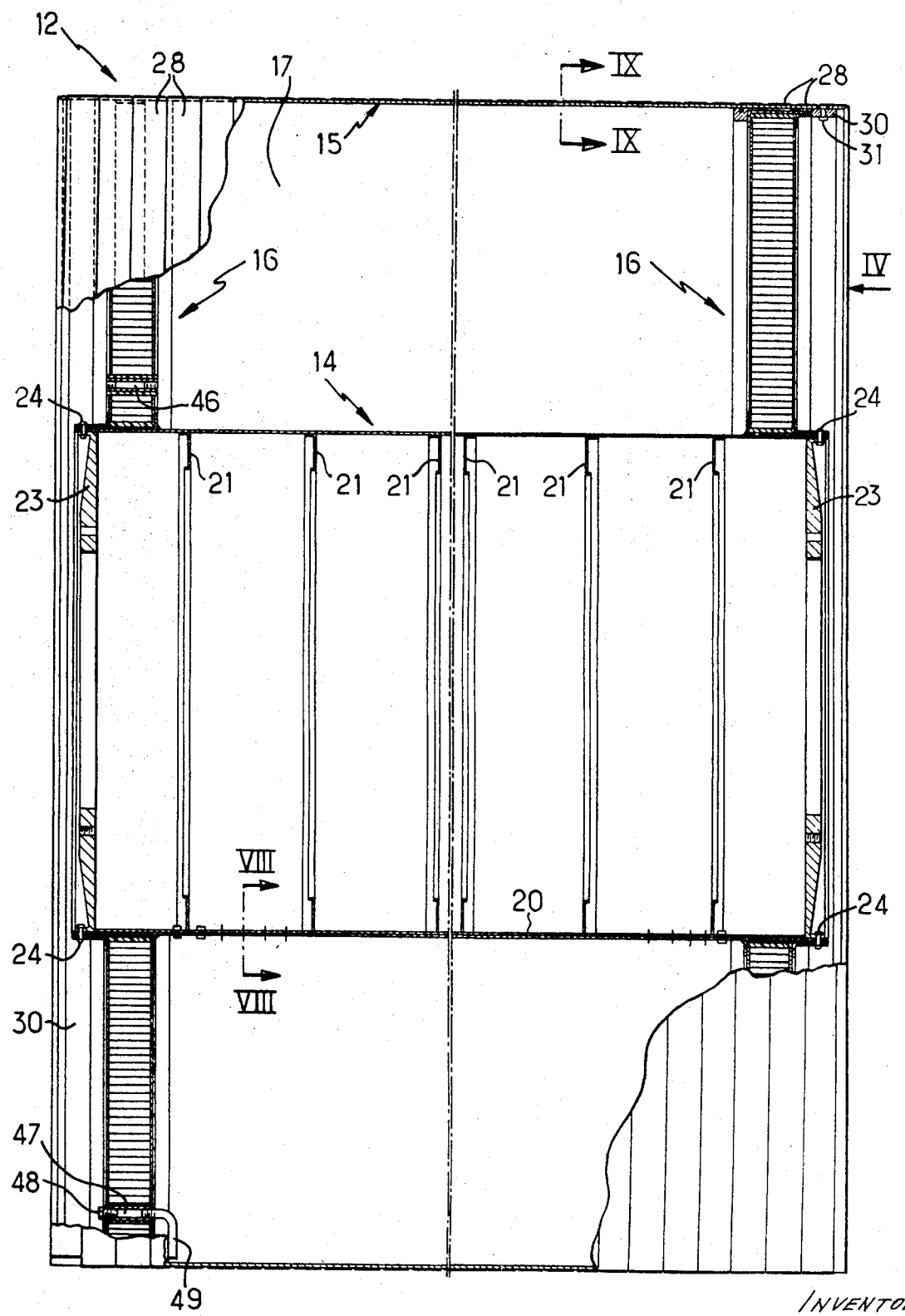
FIG. 3 is an enlarged scale view in longitudinal section of the roller shown in FIG. 2 with some elements shown in elevation.

A roller 12, as may be seen from FIGS. 3 and 4, includes an internal cylindrical wall 14, an external cylindrical wall 15 and two annular and similar sealing flanges or check plates 16, these different elements between them forming a gastight enclosure or assembly 17.

The internal wall 14 consists of a single thin-walled band or ring of light metal, for example, aluminum or duraluminium, which is preferably protected, and has "lips" 18 and 19, see FIG. 8, aligned with their ends butted and with a reinforcing and coupling plate 20 rivetted to the lips. This internal wall 14 is stiffened by means of reinforcing rings 21 welded to the internal surface of the wall, and uniformly distributed along the wall; these rings 21 are stamped metal elements, preferably of aluminum or duraluminum, each having a notch 22 abreast of the plate 20.

To secure a hub, the wall is provided at each of its extremities with a flange 23, preferably of aluminum or duraluminum, secured by means of rivets 24.

The external wall 15 is formed by a thin-walled band or ring having its ends 25,26 bevelled with a very shallow chamfer 27, see FIG. 9, so that they may be overlapped and bonded to each other; a synthetic resin glue of the Araldite type may be appropriate for a joint of this kind. This wall preferably consists of duraluminum protected on both surfaces means of aluminum, but any other method of protection or any other light material may be appropriate.

The wall 15 is externally covered by a steel strip 28 wound helically with contiguous turns on the wall and bonded to it. The bonding required for this joint may be a synthetic resin glue such as Araldite, and as may be seen from FIG. 6, it forms a continuous film 29 interposed between the wall 15 and the strip 28 covering it. This arrangement opposes any electrochemical reaction between these two elements. The film 29 may, for example, have a thickness of approximately 0.1 mm. or 0.004 inches.

At each of its extremities, the wall 15 is equipped with a locking ring 30 whose function will be understood from the description of be given later. The rings 30 are fastened to the wall 15 by means of rivets 31 and they are preferably made of light metal or alloy.

Each annular-sealing flange 16 forms a unitary assembly of composite structure produced in a single operation by the pressing and hot-bonding of different elements. Each flange 16 has a ring of sandwich structure 32 described in detail hereinafter, situated in a seat formed by two crowns or rings 33,34, one being internal, the other external; a reinforcing ring 35 backing an external ring 34 abreast of the internal ring 33; and a belt or washer 36 having a groove 37 to house a sealing joint or gasket 38 and extended by a skirt 39 passing over the external ring 34.

All these elements are preferably made of light metal or alloy, for example of aluminum or duraluminum, which, as has been stated, are hot-bonded to one another. As is shown diagrammatically in FIG. 5, there is provided at the internal periphery and at the external periphery of the ring 32 at 40 and 41 respectively, a filling material, which may for example consist of expanded synthetic material, the expansion of which has occurred during the hot-bonding operation.

The ring 32 itself comprises a core 42 of cellular structure, bounded by two "skins" 43,44. As may be seen from FIG. 4, at the cutaway portion, the core 42 has a honeycomb structure whose cells extend at right angles to the "skins" 43,44. In the example illustrated, these latter each consist of two thicknesses placed one on the other.

Each flange 16 is fastened to the internal wall 14 by means of rivets 24 similar to those used to fasten the corresponding flange 23; by contrast, at their outer periphery, the flanges 16 are freely engaged with a loose fit, in the external wall 15, but they are arranged in abutment with the locking or abutment rings 30 in order to enable fluid within the assembly to be maintained under pressure.

The hermeticity of this assembly is assured, on the one hand by the sealing joint or gasket 38 in contact with the external wall 15, and on the other hand by means of a plastic belt or filling 45 in contact with the internal wall 14.

As may be seen from FIG. 3, one of the flanges 16, i.e. the left-hand flange in the example illustrated, has a passage 46 for the reception of a valve (not illustrated) rendering it possible for the roller to be "inflated" or pressurized.

Close to the external wall 15, this same flange 16 has a second transverse passage 47, as shown in FIGS. 3 and 7. This passage may be closed off externally by means of a plug 48 and it is extended internally by an elbow pipe 49 opening in the immediate proximity of the wall 15. The passage 47 is used either to feed cooling fluid into the enclosure 17 or to withdraw such fluid from the enclosure.

As will have been noted, the greater proportion of the component parts of the casing of the roller is preferably made of metal.

In a particular embodiment of the invention the materials and dimensions of the main parts were as follows:

internal wall 14, diameter 0.8 meters or 2.624 feet,
wall thickness 2 mm. or 0.08 inches, duraluminum protected by means of aluminum;
external wall 15, diameter 1.8 meters or 5.9 feet,
wall-thickness 3 mm. or 0.118 inches, duraluminum protected by means of aluminum;
banding strip 28, gauge 0.3 mm. or 0.118 inches,
width of the turns 50 mm. or 1.97 inches, steel;
inflation pressure above atmospheric pressure, from 1 to 2 bars depending on the weight of the vehicle tested;
cooling fluid, 5 to 10 kg. or 11.02 to 22.04 lbs. of Freon 21.

A roller of this nature is easily capable of bearing a load of 1 ton, and four rollers of this kind together have an inertia equivalent to that of a car of 0.8 tons. By choosing an appropriate inflation pressure for the assembly as a function of the vehicle tested, the radius of curvature of the roller at the point at which it bears one of the wheels of the said vehicle may reach 1.5 meters or approximately 5 feet.

The scope of the present invention is not limited to the particular embodiment described and illustrated, but it includes all modified forms falling within the scope of the appended claims. In particular, the strip 28 may, for example, be positioned under tension on the wall 15 that it covers, in a similar manner to a tire on a wheel. Moreover, the roller described may be used in other industries, for example in papermaking, in bleaching or in laundering.

I claim:

1. A roller comprising a fluidtight enclosure having an outer cylindrical wall including a first lightweight metal or alloy layer and a second hard metal or alloy layer covering the first layer, an inner cylindrical wall arranged within and coaxial with the outer wall and an annular sealing flange disposed between each end of the outer wall and the corresponding end of the inner wall, and fluid within the enclosure being above atmospheric pressure.

2. A roller as claimed in claim 1, in which the fluid within the enclosure is at a pressure of 1 to 5 bars.

3. A roller as claimed in claim 1, having a valve in one of the sealing flanges whereby the pressure of the fluid may be varied.

4. A roller as claimed in claim 1, wherein the first lightweight metal or alloy layer is made of aluminum or an aluminum alloy, and the second hard metal layer is made of steel.

5. A roller as claimed in claim 4, wherein the outer cylindrical wall is a band having its ends chamfered and arranged with the chamfered surfaces overlapping and bonded together.

6. A roller as claimed in claim 5, wherein the diameter of the outer wall is between 1.5 and 2.5 meters and the thickness of the first layer of said outer wall is between 2 and 5 millimeters.

7. A roller as claimed in claim 6, wherein the second layer comprises a steel strip wound helically with contiguous turns on the outer surface of the first layer.

8. A roller as claimed in claim 7 wherein the first layer is bonded to the strip.

9. A roller as claimed in claim 8, wherein the inner cylindrical wall is a band having its end butted and including a reinforcing plate joined to the ends of the band on either side of the butted ends.

10. A roller as claimed in claim 9, including reinforcing rings of lightweight metal or alloy, arranged on the internal surface of the inner cylindrical wall uniformly along its length.

11. A roller as claimed in claim 1, further comprising a flange plate of lightweight metal or alloy at each end of the inner cylindrical wall.

12. A roller as claimed in claim 11, wherein one of said sealing flanges is integrally formed with a hot-bonded composite structure, the inner periphery of said sealing flange being hermetically fastened to the inner wall of the enclosure and the outer periphery of said flange abutting against an annular rim fixed to the outer wall of the enclosure.

13. A roller as claimed in claim 12, wherein each of said sealing flanges has sandwich structure including a cellular core covered on both sides.

14. A roller as claimed in claim 13, further comprising a ring having a groove for sealing means arranged between each sealing flange and the outer wall.

15. A roller as claimed in claim 1, further comprising a second fluid within the enclosure, said second fluid being a refrigerant.

16. A roller as claimed in claim 15, further comprising means mounted in one of the sealing flanges and including a pipe bent towards the outer wall into proximity therewith for feeding in or withdrawing the said refrigerant.

17. In a stationary test stand for motor vehicles, a roller comprising a fluidtight enclosure having an outer cylindrical wall including a first lightweight metal or alloy layer and a second hard metal or alloy layer covering the first layer, an inner cylindrical wall arranged within and coaxial with the outer wall, an annular sealing flange disposed between each end of the outer wall and the corresponding end of the inner wall, and fluid within the enclosure at superatmospheric pressure.